(12) United States Patent
Kim et al.

(10) Patent No.: US 10,425,521 B2
(45) Date of Patent: Sep. 24, 2019

(54) APPARATUS AND METHOD FOR EXECUTING APPLICATION FOR MOBILE DEVICE

(71) Applicant: NAVER CORPORATION, Seongnam-si (KR)

(72) Inventors: Min Chul Kim, Seoul (KR); Hyun Geun Jo, Seoul (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 15/713,156

(22) Filed: Sep. 22, 2017

(65) Prior Publication Data
US 2018/0013876 A1    Jan. 11, 2018

Related U.S. Application Data

(63) Continuation-in-part of application No. PCT/KR2016/002869, filed on Mar. 22, 2016.

(30) Foreign Application Priority Data

Mar. 23, 2015  (KR) .................. 10-2015-0040062
Aug. 26, 2015  (KR) .................. 10-2015-0120165

(51) Int. Cl.
*H04M 1/725* (2006.01)
*G06F 9/44* (2018.01)
(Continued)

(52) U.S. Cl.
CPC ........ *H04M 1/72533* (2013.01); *G06F 3/023* (2013.01); *G06F 3/038* (2013.01);
(Continued)

(58) Field of Classification Search
CPC ..... H04M 1/72583; H04L 51/18; H04W 4/12; G06F 3/023; G06F 3/038; G06F 3/04883
(Continued)

(56) References Cited

U.S. PATENT DOCUMENTS 7,146,129 B2 * 12/2006 Bostrom ........... H04M 1/72533
455/3.03
2010/0066698 A1 * 3/2010 Seo ..................... G06F 3/04883
345/173
(Continued)

FOREIGN PATENT DOCUMENTS

JP     2000222522 A     8/2000
JP     2006345337 A    12/2006
(Continued)

OTHER PUBLICATIONS

European search report dated Sep. 3, 2018 by the EPO corresponding to European patent application No. 16 769 076.7.
(Continued)

*Primary Examiner* — William Nealon
(74) *Attorney, Agent, or Firm* — Greer, Burns & Crain, Ltd.

(57) ABSTRACT

The present invention relates to an apparatus and a method for executing a desired application on any screen of a mobile device by a simple operation without switching a screen. The apparatus for executing an application for a mobile device according to one embodiment of the present invention comprises: a text input unit; an application recognition unit for recognizing an application to be executed; a message recognition unit for recognizing an operation message to be performed in the application to be executed on the basis of the text which is inputted through the text input unit; a transmission instruction sensing unit for sensing an operation message transmission instruction of a user; a message transfer unit for transferring the operation message to the application when the transmission instruction sensing unit senses the operation message transmission instruction; and an application execution unit for executing the operation message transferred by the message transfer unit.

20 Claims, 20 Drawing Sheets

(51) Int. Cl.
*H04W 4/12* (2009.01)
*H04L 12/58* (2006.01)
*G06F 3/023* (2006.01)
*G06F 3/038* (2013.01)
*G06F 3/0488* (2013.01)

(52) U.S. Cl.
CPC ............ *G06F 3/04883* (2013.01); *G06F 9/44* (2013.01); *H04L 51/18* (2013.01); *H04W 4/12* (2013.01)

(58) Field of Classification Search
USPC ........................................................ 455/420
See application file for complete search history.

(56) References Cited

U.S. PATENT DOCUMENTS

| | | | |
|---|---|---|---|
| 2011/0225330 A1* | 9/2011 | Lavian | H04M 1/72527 710/63 |
| 2014/0015776 A1* | 1/2014 | Kim | G06F 3/03545 345/173 |
| 2014/0359504 A1* | 12/2014 | Kim | G06F 3/0488 715/768 |
| 2015/0142897 A1* | 5/2015 | Alten | H04L 51/36 709/206 |
| 2018/0189250 A1* | 7/2018 | Lee | G06Q 10/101 |

FOREIGN PATENT DOCUMENTS

| | | |
|---|---|---|
| JP | 2010-257469 A | 11/2010 |
| JP | 2014049140 A | 3/2014 |
| JP | 2014143660 A | 8/2014 |
| KR | 10-2012-0116147 A | 10/2012 |
| KR | 10-1328202 B1 | 11/2013 |
| KR | 10-1476180 B1 | 12/2014 |
| KR | 10-2015-0028008 A | 3/2015 |
| WO | 2014171605 A1 | 10/2014 |
| WO | 2014175395 A1 | 10/2014 |

OTHER PUBLICATIONS

Int'l. Search Report issued in Int'l. Application No. PCT/KR2016/002869, dated Jul. 28, 2016.

Japanese Office Action dated Oct. 16, 2018 by the Japanese Patent Office corresponding to Japanese patent application No. 2017-547104.

Japanese Office Action dated May 21, 2019 by the Japanese Patent Office corresponding to Japanese patent application No. 2017-547104.

\* cited by examiner

APPARATUS AND METHOD FOR EXECUTING APPLICATION FOR MOBILE DEVICE

CROSS-REFERENCE TO RELATED APPLICATIONS

This is a continuation-in-part application of International Application No. PCT/KR2016/002869, filed Mar. 22, 2016, which claims benefit of Korean Patent Application Nos. 10-2015-0040062, filed Mar. 23, 2015 and 10-2015-0120165 filed Aug. 26, 2015.

BACKGROUND OF THE INVENTION

Field of Invention

Example embodiments relate to an application execution apparatus and method of a mobile device, and more particularly, to an apparatus and method for executing a desired application with a simple manipulation without switching a screen of a mobile device.

Description of Related Art

In general, applications, for example, a message transmission application, a notification application, a calendar application, a memo application, etc., may be installed on a mobile device, for example, a smartphone. In addition, applications with various functions may be installed on the mobile device. The mobile device may be wirelessly connected to a peripheral external device. An exclusive application for the external device may be installed on the mobile device and be used to control the external device.

To execute an application of a mobile device, there is a need to find and execute an execution button of the corresponding application on an idle screen of the mobile device. Accordingly, if there is a need to execute another application while an application is currently being executed, the following process is to be performed:

Close the window of the first application currently in execution or terminate the execution of the first application by pushing a home button or a back button.

Find an execution button of the second application to be executed.

Execute the second application.

Touch a necessary button or input an instruction.

Close a window of the second application or terminate the execution thereof.

Execute again the first application that has been in execution at the initial stage.

As described above, if there is a need to execute another application while an application is already being executed, for example, if a task, such as transmission of a message, setting of a notification, registration of a schedule to a calendar, storing a memo, etc., controlling an external device connected to the mobile device, etc., is required, the aforementioned plurality of operations need to be performed, which inconveniences the user. In addition, a relatively large amount of time may be used to go through the above process and the continuity of a task being performed through the application that has been in execution at an earlier stage may be degraded.

BRIEF SUMMARY OF THE INVENTION

One or more example embodiments provide an application execution apparatus and method that perform a desired task with a simple manipulation, without switching the screen currently in use, when there is a need to execute an application on a mobile device.

One or more example embodiments also provide an application execution apparatus and method that efficiently execute another application without degrading the continuity of the task of an application currently being executed.

An application execution apparatus of a mobile device according to an example embodiment includes a text input device; an application recognizer configured to recognize an application to be executed; a message recognizer configured to recognize a task message to be performed on the application to be executed based on a text that is input through the text input device; a transmission instruction detector configured to detect a task message transmission instruction of a user; a message transferor configured to transfer the task message to the application in response to detecting the task message transmission instruction using the transmission instruction detector; and an application executor configured to execute the task message transferred from the message transferor. The text input device is configured to perform a task of the application on a current screen without performing switching to the application to be executed.

The application recognizer may be configured to recognize a text input with a specific symbol as the application to be executed, and the message recognizer may be configured to recognize a remaining portion as the task message to be performed on the application. The application execution apparatus may further include an application designator configured to display a plurality of applications on a screen to select a single application from among the plurality of applications, in response to the plurality of applications being designated to the text input with the specific symbol in the text input through the text input device. The message transferor may be configured to transfer the input text to a memo application in response to an absence of the text input with the specific symbol in the text input through the text input device and in response to detecting the task message transmission instruction using the transmission instruction detector.

The transmission instruction detector may be configured to recognize a preset first swipe motion of the user as the task message transmission instruction.

The application execution apparatus may further include a text box creator configured to create a text box in response to detecting a preset second swipe motion of the user on a screen on which the text box is absent.

The application execution apparatus may further include an instruction display configured to display a plurality of functions on a screen in response to the plurality of functions being set to the application recognized by the application recognizer.

The application execution apparatus may further include an application execution notifier configured to display an application execution result on a screen in response to executing the application using the application executor.

The application execution apparatus may further include an external device control screen display configured to display a remote controller screen capable of controlling an external device in response to the application recognized by the application recognizer being an application for controlling the external device and in response to detecting a preset third swipe motion of the user.

The application execution apparatus may further include an external device searcher and connector configured to search for an external device from among peripheral devices and to connect the external device to a mobile device in response to the application recognized by the application recognizer being an application for controlling the external device.

An application execution method of a mobile device according to an example embodiment includes a text input operation; an application recognition operation of recognizing an application to be executed by a user; a message recognition operation of recognizing a task message to be performed on the application to be executed based on an input text; a transmission instruction detection operation of detecting a task message transmission instruction of the user; a message transfer operation of transferring the task message to the application to be executed by the user in response to detecting the task message transmission instruction of the user; and an application execution operation of executing the transferred task message. A task of the application is performed on a current screen without performing switching to the application at which the user desires to perform the task.

The application recognition operation may recognize a text input with a specific symbol as the application at which the task is to be performed, and the message recognition operation may recognize a remaining portion as the task message to be performed on the application. The application execution method may further include an application display operation of displaying a plurality of applications on a screen to select a single application from among the plurality of applications, in response to the plurality of applications being designated to the text input with the specific symbol in the text that is input in the text input operation. In response to an absence of the text input with the specific symbol in the text input in the text input operation, when the task message transmission instruction is detected, the input text is transferred to a memo application.

The transmission instruction detection operation may recognize a preset first swipe motion of the user as the task message transmission instruction.

The application execution method may further include a text box creation operation of creating a text box in response to detecting a preset second swipe motion of the user on a screen on which the text box is absent.

The application execution method may further include an instruction display operation of displaying a plurality of function in response to the plurality of functions being set to the application recognized in the application recognition operation.

The application execution method may further include an application execution notification operation of displaying an application execution result on a screen in response to executing the application in the application execution operation.

The application execution method may further include an external device control screen display operation of displaying a remote controller screen capable of controlling an external device in response to the application recognized in the application recognition operation being an application for controlling the external device and in response to detecting a preset third swipe motion of the user.

The application execution method may further include an external device searcher and connection operation of searching for an external device from among peripheral devices and connecting the external device to the mobile device in response to the application recognized in the application recognition operation being an application for controlling the external device.

According to example embodiments, when there is a need to execute an application on a mobile device, the desired application may be executed with a simple manipulation of a text input and a message transmission instruction without switching a screen.

When there is a need to execute an application during the current execution of another application, it is possible to remove inconveniences of terminating the first application or returning to an idle screen and executing the other application, and then re-executing the first application in response to terminating the other application. Also, it is possible to save an amount of time used to execute the application. Since there is no need to close the screen of the first application in execution or terminate the application, the continuity of the task performed by the first application may be maintained.

DETAILED DESCRIPTION OF THE INVENTION

Hereinafter, example embodiments are described in detail to be easily implemented by one of ordinary skill in the art with reference to the accompanying drawings. A description related to a portion irrelevant to the disclosure is omitted for clarity of description. It should be understood that various modifications and changes may be made in the example embodiments disclosed in the specification without departing from the spirit and scope of the disclosure. Accordingly, the scope of the disclosure is not defined by the detailed description, but by the claims and their equivalents and all variations within the scope of the claims and their equivalents are to be construed as being included in the disclosure.

Figure 1:
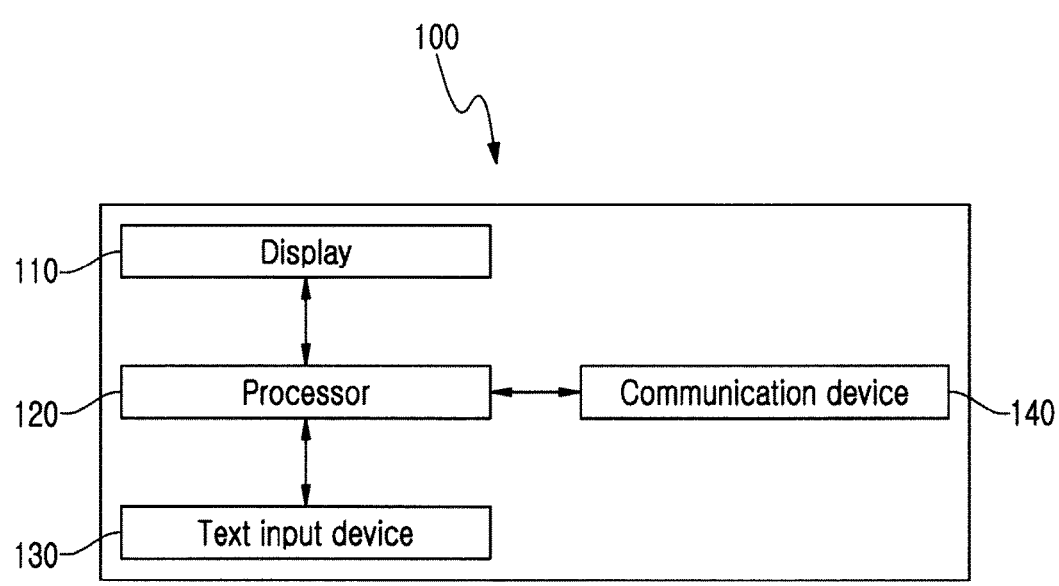
FIG. 1 illustrates an application execution apparatus according to one example embodiment.

FIG. 1 illustrates a mobile device incorporating an application execution apparatus according to one example embodiment.

Referring to FIG. 1, a mobile device 100 may be a user terminal as an application execution device configured to execute an application. The mobile device 100 may be, for example, a smartphone, a personal computer (PC), a laptop computer, a tablet, an Internet of Things (IoT), a wearable device, or the like.

The mobile device 100 includes a communication device 140, a processor 120, a display 110, and a text input device 130.

The communication device 140 is a device used by the mobile device 100 to communicate with a server or another mobile device. That is, the communication device 140 may be a hardware module, such as a network interface card, a network interface chip, a networking interface port, etc., of the mobile device 100, to transmit and receive data/information to and from the server or the other mobile device, or a software module, such as a network device driver or a networking program.

The processor 120 manages components of the mobile device 100, and may execute programs or applications used by the mobile device 100. The processor 120 may execute the applications or may perform functions of the applications, and may process operations used for executing the applications and performing the functions of the applications. Also, the processor 120 is configured to process data received from the communication device 140. The processor 120 may be at least one process of the mobile terminal 100 or the processor 120 comprises at least one core within a processor of the mobile terminal 100.

The display 110 may display data input from a user of the mobile device 100 or may display data associated with the executed application. For example, the display 110 may include a touch screen. In this case, the display 110 may include a function of an input device, for example, for receiving a text from the user.

The text input device 130 is a device used by the user of the mobile device 100 to input a text. The text input device 130 may include, for example, a physical keyboard or keypad, or a virtual keyboard.

Figure 2:
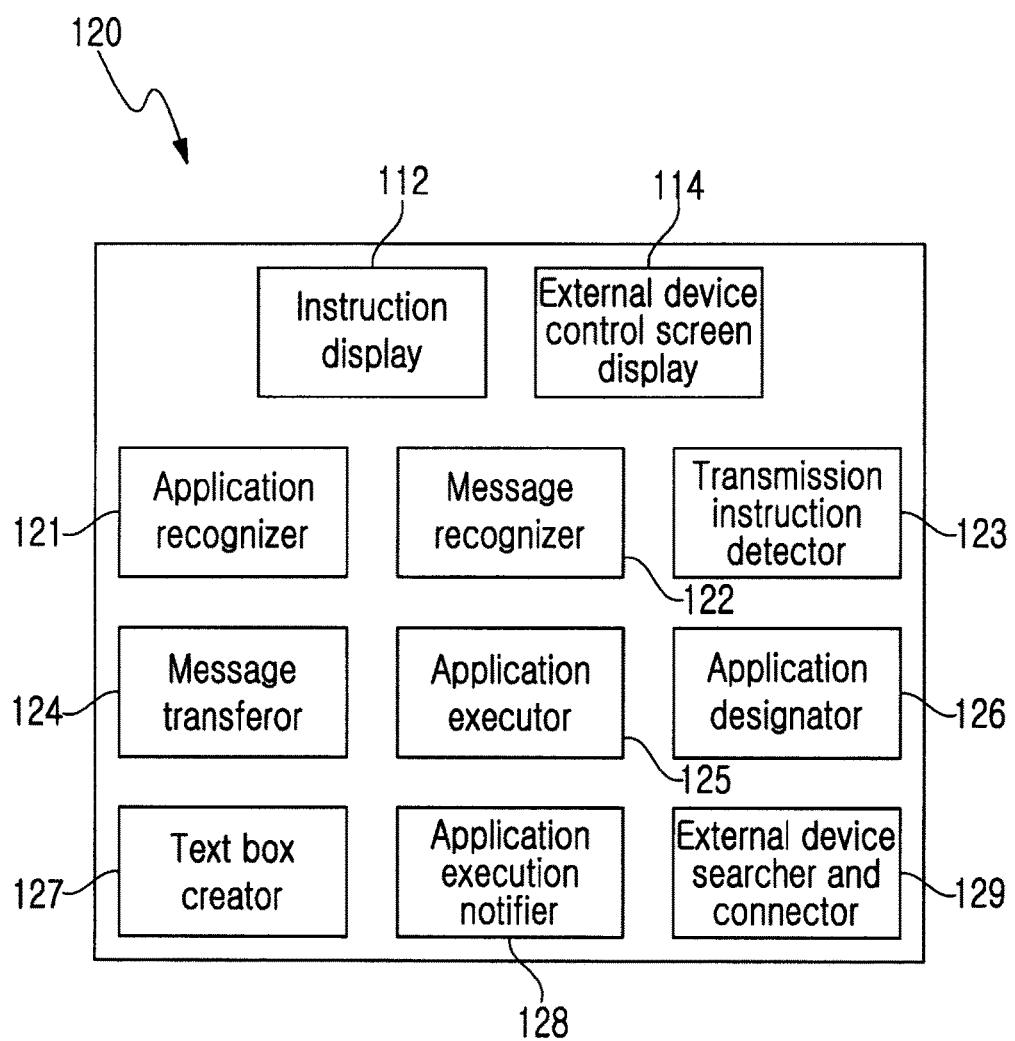
FIG. 2 illustrates a processor of the application execution apparatus according to one example embodiment.

FIG. 2 illustrates the processor 120 of the mobile device 100 according to one example embodiment.

Referring to FIG. 2, the processor 120 includes an application recognizer 121 configured to recognize an application to be executed, a message recognizer 122 configured to recognize a task message to be performed on the application to be executed based on a text that is input through the text input device 130, a transmission instruction detector 123 configured to detect a task message transmission instruction of a user, a message transferor 124 configured to transfer the task message to the application in response to detecting the task message transmission instruction using the transmission instruction detector 123, and an application executor 125 configured to execute the task message transferred from the message transferor 124.

The processor 120 may further include an application designator 126 configured to display a plurality of applications on a screen, for example, the display 110, to select a single application from among the plurality of applications, in response to the plurality of applications being designated to the text input with the specific symbol in the text input through the text input device 130.

The processor 120 may further include a text box creator 127 configured to create a text box on the display 110 in response to detecting a preset second swipe motion of the user on a screen, for example, the display 110, on which the text box is absent.

The processor 120 may further include an instruction display 112 configured to display a plurality of functions on a screen, for example, the display 110, of the mobile device 100 in response to the plurality of functions being set to the application recognized by the application recognizer 121.

The processor 120 may further include an application execution notifier 128 configured to display an application execution result on a screen, for example, the display 110, of the mobile device 100 in response to executing the application using the application executor 125.

The processor 120 may further include an external device control screen display 114 configured to display a remote controller screen capable of controlling an external device using a screen, for example, the display 110, of the mobile device 100 in response to the application recognized by the application recognizer 121 being an application for controlling the external device and in response to detecting a preset third swipe motion of the user.

Also, the processor 120 may further include an external device searcher and connector 129 configured to search for an external device from among peripheral devices and to connect the external device to the mobile device in response to the application recognized by the application recognizer 121 being an application for controlling the external device.

At least a portion of one or more components of the instruction display 112, the external device control screen display 114, and the application execution notifier 128 may be provided on the display 110.

In the following description, functions and operations performed by components, for example, the instruction display 112, the external device control screen display 114, and the application recognizer 121 through the external device searcher and connector 129 (components 121-129) may be described to be performed by the mobile device 110 or the processor 120, and reference numerals of some components that constitute the mobile device 110 may be omitted for convenience sake and better understanding.

Each of the components 112, 114, 121-129 of the processor 120 may be a software module implemented by the processor 120, or a hardware module included in the processor 120. The components 112, 114, 121-129 of the processor 120 are associated with applications or functions thereof described herein.

Figure 3:
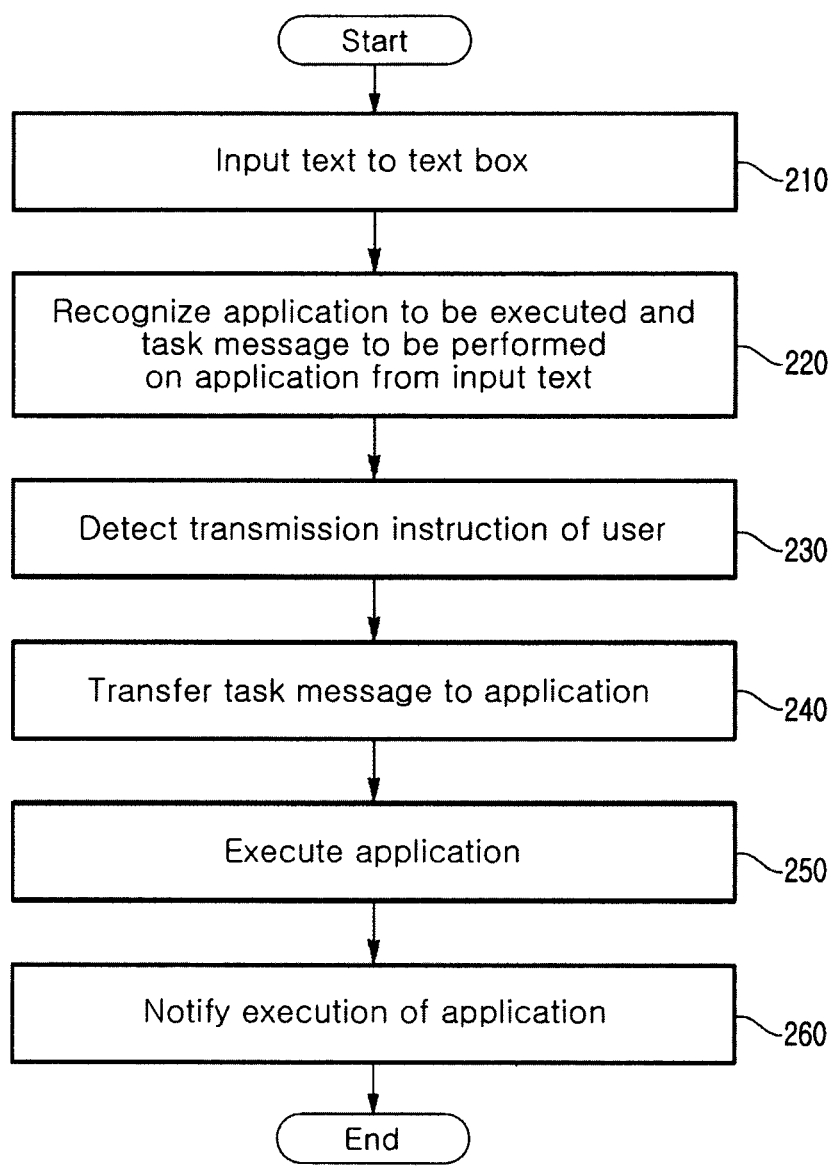
FIG. 3 illustrates a process of executing a desired application on a screen of a mobile device according to one embodiment.

FIG. 3 illustrates a process of executing a desired application without performing screen switching on a screen of a mobile device according to one embodiment.

Referring to FIG. 3, a user inputs a text to a text box using the text input device 130 on a screen of a mobile device 100 that the user is currently using (step 210). Regardless of a screen type such as a message transmission screen, a memo input screen, an Internet search screen, etc., the screen on which the text box is displayed uses, as the text input device 130, a virtual keyboard that is displayed on the screen in response to activating the text box. If an external input device is connected to the mobile device 100, the external input device may be used as the text input device 130.

The text box and the text input device 130 may not be displayed on the screen currently in use. In this case, in response to the user performing a motion of swiping a touch screen from down to up, the text box creator 127 of the processor 120 may detect the motion and may display the text box and the text input device 130 on the screen 110. Although the text box is not displayed on the screen currently in use, a text input is enabled using the text box creator 127 without switching the screen.

Once the user inputs a text, the application recognizer 121 and the message recognizer 122 recognize an application to be executed and a message, for example, a task message, to be performed on the application, respectively, from the input text (step 220). For example, the application recognizer 121 recognizes an application to be executed based on a text input with a specific symbol, such as @ and #, and the message recognizer 122 recognizes a remaining portion as a task to be performed on the application.

An application that is frequently used at the mobile device 100 may be preset as a default application. Once the application is set as the default application, the default application is recognized as the application to be executed if the input text does not include a text with a specific symbol associated with an application designation.

The application recognizer 121 may recognize the application to be executed based on a text input to a text input box. When a separate icon for designating the application to be executed is displayed on the screen, the application recognizer 121 may recognize a touch of the user on the icon and may recognize the application to be executed. A description related thereto is made below.

When the user inputs the text and gives a message transmission instruction for executing a task message on the application to be executed, the transmission instruction detector 123 detects the message transmission instruction (step 230). The message transmission instruction may include a preset swipe motion (or gesture), for example, a swipe motion in a "√" form, using the touch screen, and may use any type of instructions that may be distinguishably recognized from other functions of execution instructions stored in the mobile device 100.

Once the transmission instruction detector 123 detects the message transmission instruction of the user, the task message is transferred to the designated application by the message transferor 124 (step 240) and the application is executed (step 250). Here, an application execution notifier 128 notifies the user that the application is executed (step 260). The execution of the application may be notified by displaying a popup window on a current screen, or by using a notification sound, a vibration, or the like.

As described above, according to example embodiments, in the case of executing an application that is not currently displayed on a screen being used at a mobile device 100 such as a smartphone, the application may be executed by inputting a task message of the application to be executed to a text box of the current screen and by giving a simple message transmission instruction without switching the screen. Hereinafter, various example embodiments are described with reference to the accompanying drawings to further easily and clearly understand the disclosure.

Figure 4:
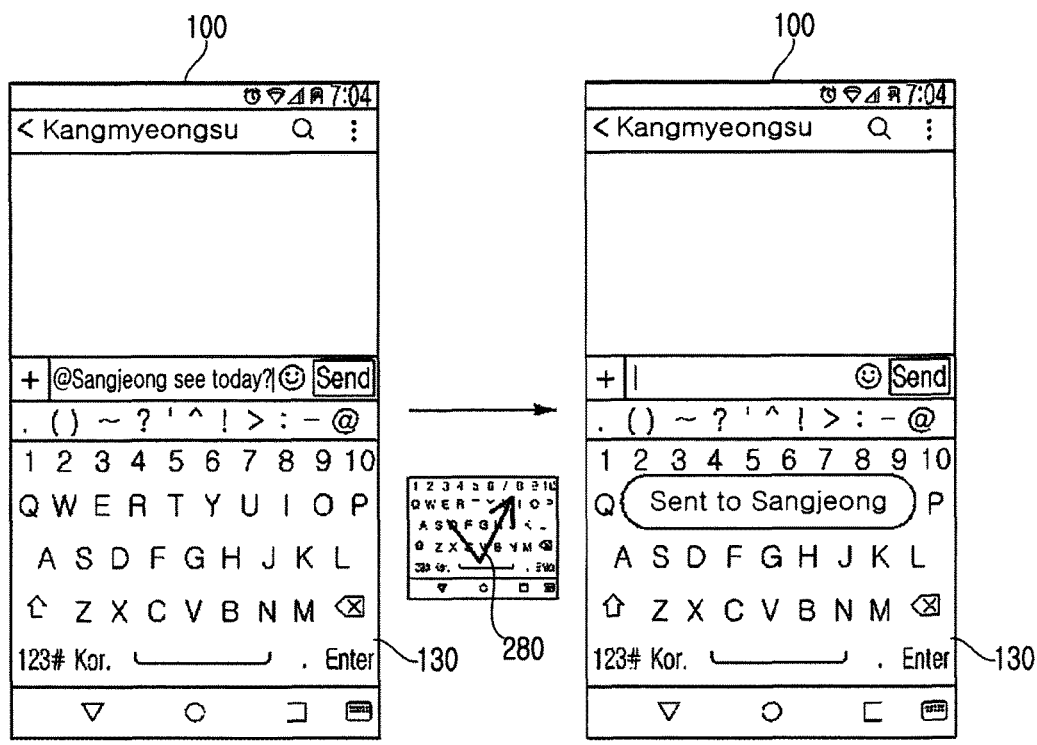
FIGS. 4 and 5 illustrate an example of inputting a text for a message transmission and performing the message transmission on a screen of a mobile device according to one embodiment.
Figure 5:
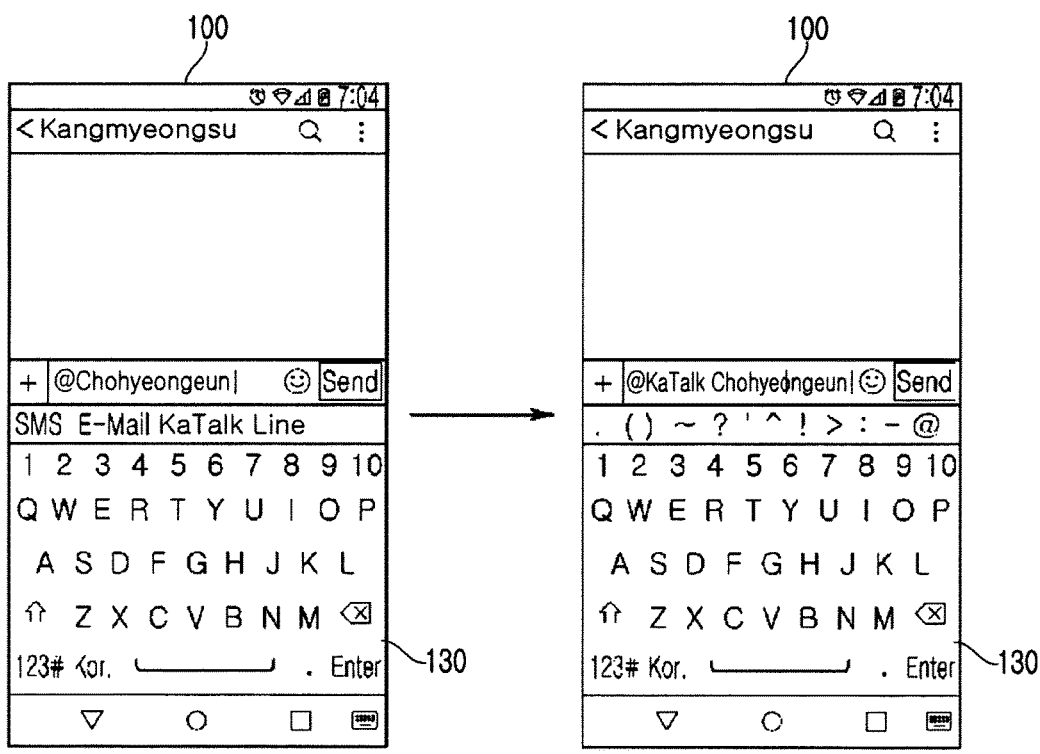

FIGS. 4 and 5 illustrate an example of inputting a text for a message transmission and performing the message transmission on a screen of a mobile device according to one embodiment.

Referring to FIG. 4, a user inputs a text "@Sangjeong see today" in a text box of a current screen of a smartphone and performs a swipe motion of "√" 280 on a touch screen. Here, the application recognizer 121 recognizes an application to be executed from a portion "Sangjeong" input with a symbol "@" in the input text, and recognizes a remaining portion "see today" as a task message to be performed on the application. In the example embodiment, if the text input with "@" is information stored in a contact list of the mobile device 100, a message is set to be transmitted to a corresponding contact through a message transmission application. Also, the swipe motion of "√" 280 is set as an instruction to transmit the task message to the designated application. Accordingly, the application recognizer 121 recognizes the message transmission application as the application to be executed from the text "@Sangjeong", and transfers a task message of transmitting a message "see today?" to "Sangjeong" to the message transmission application through the message transferor 124 when the transmission instruction detector 123 detects the swipe motion of "√" 280, for example, a task message transmission instruction, of the user. The message transmission application receives the task message and executes the corresponding task, and the application execution notifier 128 executes the application and displays a notification window stating "Sent to Sangjeong" on the screen.

In the example embodiment, the message transmission application is designated as the application to be executed by inputting a name stored in the contact list with the specific symbol such as "@", and at the same time, a target to which the message is to be transmitted in response to executing the application is designated. However, a plurality of applications for transmitting a message may be installed on a single mobile device. In this case, the application designator 126 may display the plurality of applications on the screen so that the user may select a single application from among the plurality of message transmission applications.

Referring to FIG. 5, once "@Chohyeongeun" is input, the application recognizer 121 and the message recognizer 122 recognize that a message is to be transmitted to "Chohyeongeun" using the message transmission application. Here, if a plurality of message transmission applications, such as "SMS", "e-mail", "KaTalk", "LINE", etc., are installed, the application designator 126 would display the plurality of message transmission applications at a lower end of a text box so that the user may select a desired application. If the user touches and selects "KaTalk", the application recognizer 121 and the message recognizer 122 recognize that the message is to be transmitted to "Chohyeongeun" through the application "KaTalk".

Figure 6:
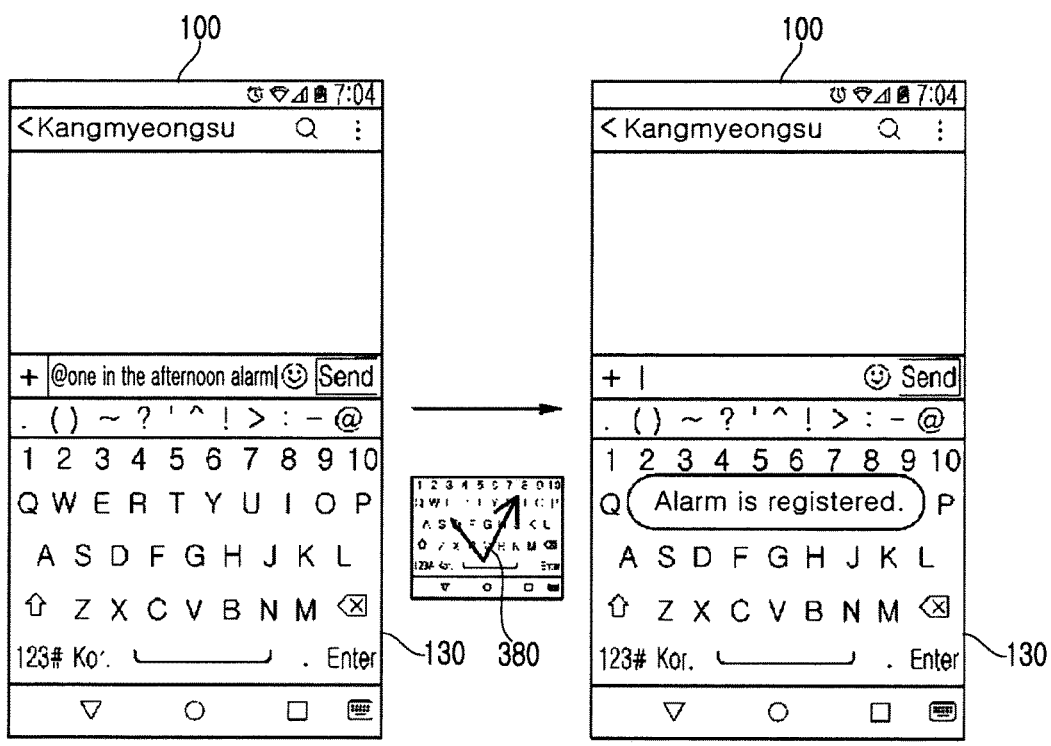
FIG. 6 illustrates an example of setting a notification on a screen of a mobile device according to one embodiment.
Figure 7:
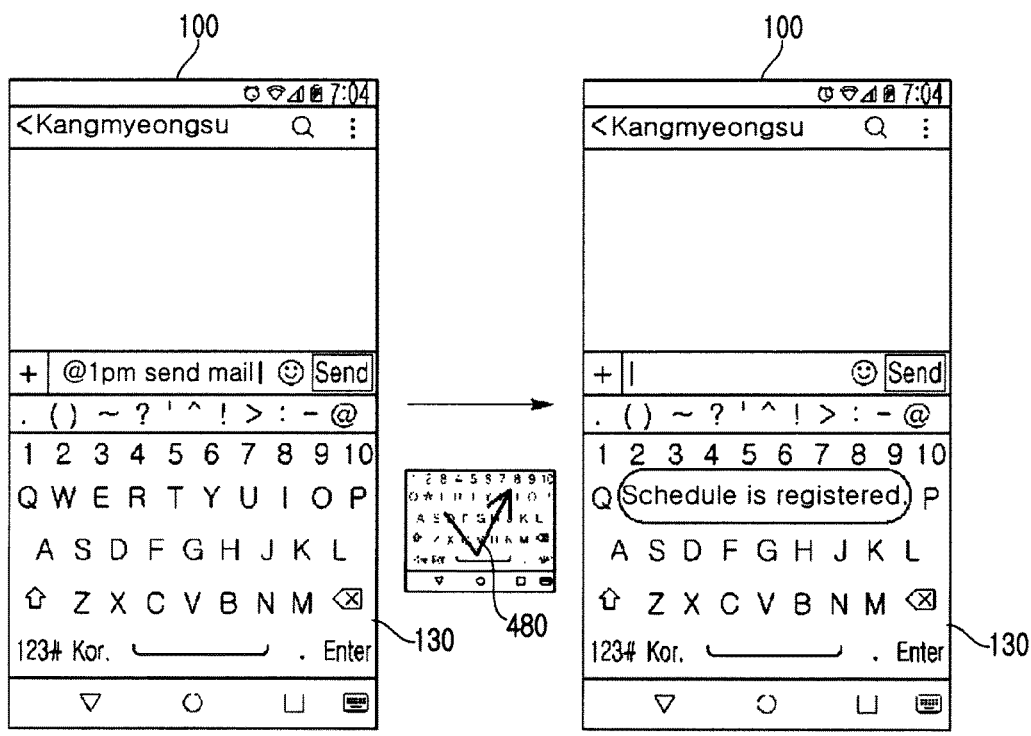
FIG. 7 illustrates an example of registering a schedule to a calendar on a screen of a mobile device according to one embodiment.

FIGS. 6 and 7 illustrate an example of setting a notification and an example of registering a schedule on a calendar on a screen of a mobile device, respectively, according to one embodiment.

In FIG. 6, "@one in the afternoon alarm" is input in a text box. In FIG. 7, "@1 pm send mail" is input in a text box. If a user inputs a time using all letters with a symbol "@" for recognizing an application, the user intends to designate an alarm application for setting an alarm. If the user inputs the time using numbers and alphabetical letters, such as pm or am, the user intends to designate a calendar application for registering a schedule. Accordingly, in FIG. 6, in response to detecting a transmission instruction, for example, a swipe motion of "√" 380, a task message of setting an alarm at 1 pm is transferred to the alarm application and the alarm application is executed. After the execution of the application, an execution result, for example, "Alarm is registered," is displayed on the screen. In FIG. 7, in response to detecting a transmission instruction 480, a task message of registering a schedule "send mail at 1 pm" to the calendar application is transferred to the calendar application and the calendar application is executed. After the execution of the application, an execution result, for example, "Schedule is registered", is displayed on the screen.

Although the example embodiment describes that, when the time with the symbol "@" is input using letters, it is recognized as a message associated with an alarm registration, and when the number is input, it is recognized as a message associated with a schedule registration, the setting may be performed in an opposite manner. Alternatively, the setting may be performed to directly input names of applications to be executed, such as "@alarm" and "@calendar", as instructions with respect to the alarm registration and the calendar registration, respectively, and to recognize the corresponding applications. Alternatively, similar to the example of FIGS. 4 and 5, if a time is input with the symbol "@" regardless of any input type, such as "one in the afternoon" or "1 pm", "alarm" or "calendar" may be displayed at a lower end of a text box so that the user may select and set the application to be executed, for example, using the application designator 126, and the user may select the application and may additionally input a detailed message.

Figure 8:
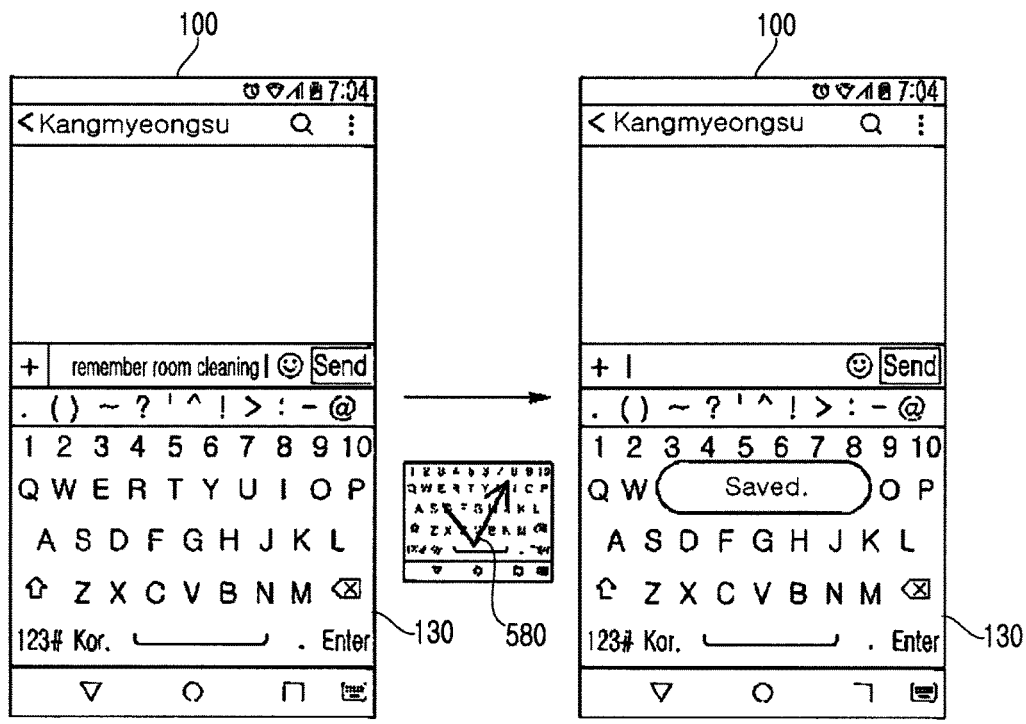
FIG. 8 illustrates an example of storing a memo on a screen of a mobile device according to one embodiment.

FIG. 8 illustrates an example in which only a message "remember room cleaning" is input without an input of a symbol used to designate an application. In this case, a preset default application, is set to be executed. In the example embodiment, a memo application is set as the default application. Thus, in response to a transmission instruction 580 of a user, the message "remember room cleaning" is transferred to the memo application and the memo application is executed. That is, a memo is stored. Also, once the message is stored on the memo application, a notification window for notifying the user of an application execution result is displayed on a screen.

In addition, to a message transmission, an alarm setting, a schedule registration, and a memo storage, a bulletin board posting using an SNS application, a music playback using a music application, a financial transaction using a bank application, a stock transaction using a security corporation application, a food order using a food delivery application, etc., may be executed in the same manner of inputting a message to a text box on a screen and thereby giving a transmission instruction.

Figure 9:
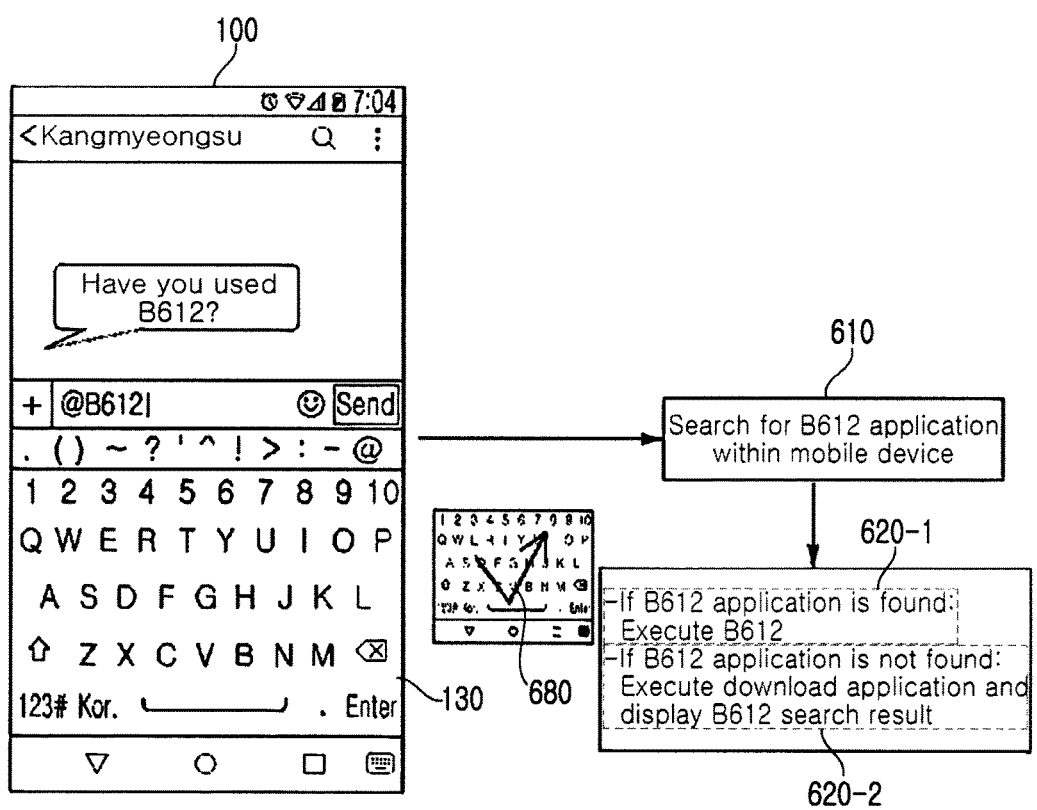
FIG. 9 illustrates an example of verifying whether a specific application is installed and executing the application on a screen of a mobile device according to one embodiment.

In the meantime, an FIG. 9 illustrates an example where an application recognized from an input text may not be installed on the mobile device 100. In this case, once a text "@B612" is input in a text box, the application recognizer 121 recognizes "B612" as an application to be executed. In response to a transmission instruction 680 of a user, this application is retrieved from the mobile device 100 (Step 610). That is, the processor 120 may search for an application corresponding to "B612" within the mobile device 100. If the application "B612" is installed on the mobile device 100, the application "B612" may be executed (Step 620-1). Otherwise, the application "B612" may not be executed (Step 620-2).

In the example embodiment, if the recognized application is not installed on the mobile device 100, a search result of the corresponding application is displayed by executing an application store, such as GOOGLE PLAY and AppStore. As described above, in the example embodiment, when an application not installed on the mobile device 100 is determined to be designated as a result of recognizing a message input to a text box, the corresponding application may be retrieved from an application store and the search result may be displayed. Accordingly, although the user becomes aware of information about a new application during conversation over a messenger, from a news article, etc., the user may immediately download and use the desired application on a current screen.

According to example embodiments, it is possible to display an icon for executing a specific application on a screen with the text input device 130, and to execute the desired application without performing a screen switching on a screen of the mobile device 100.

Figure 10:
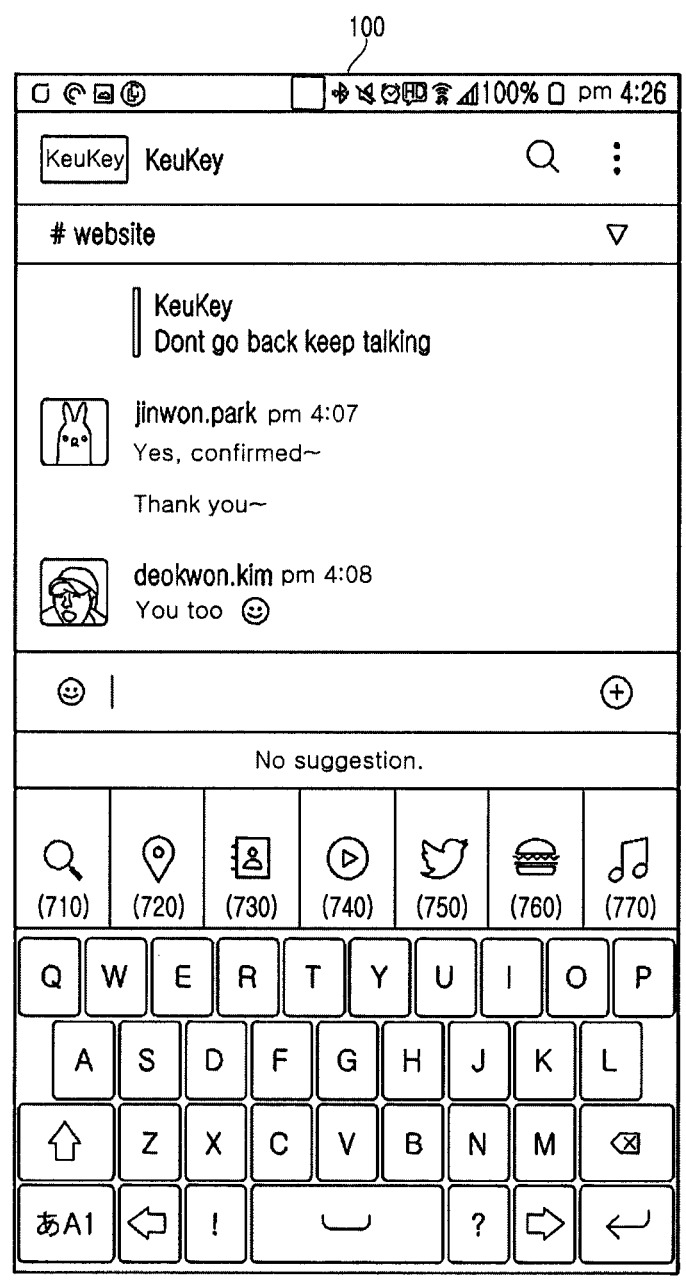
FIGS. 10 through 12 illustrate an example of performing a screen search and a TWITTER posting on a screen of a mobile device according to one embodiment.
Figure 11:
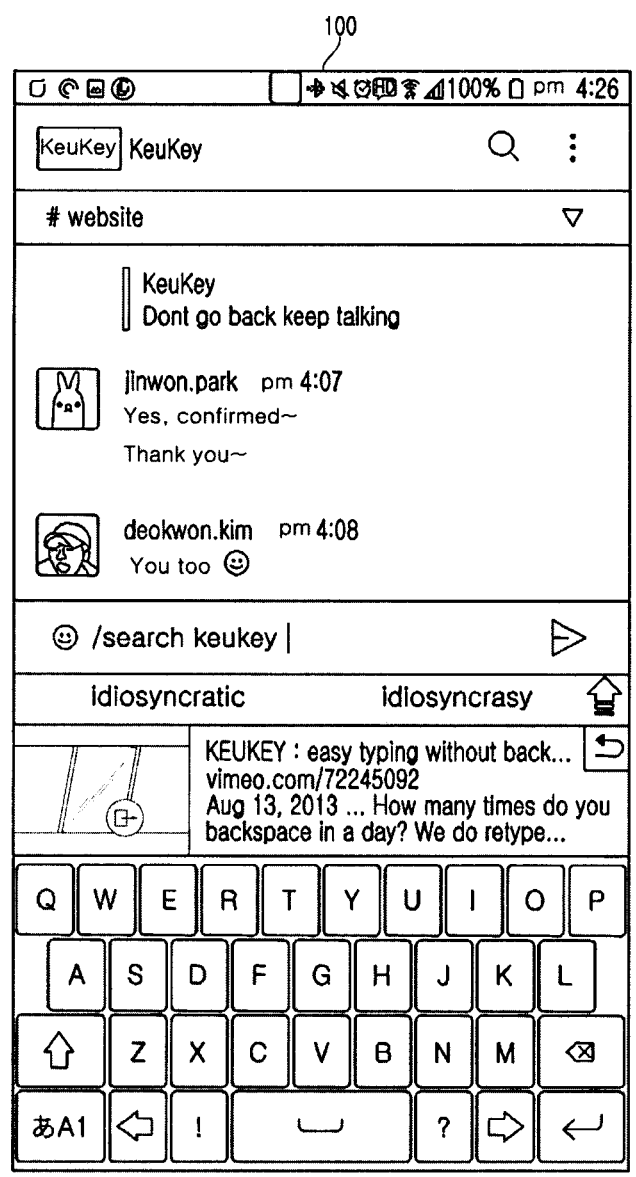
Figure 12:
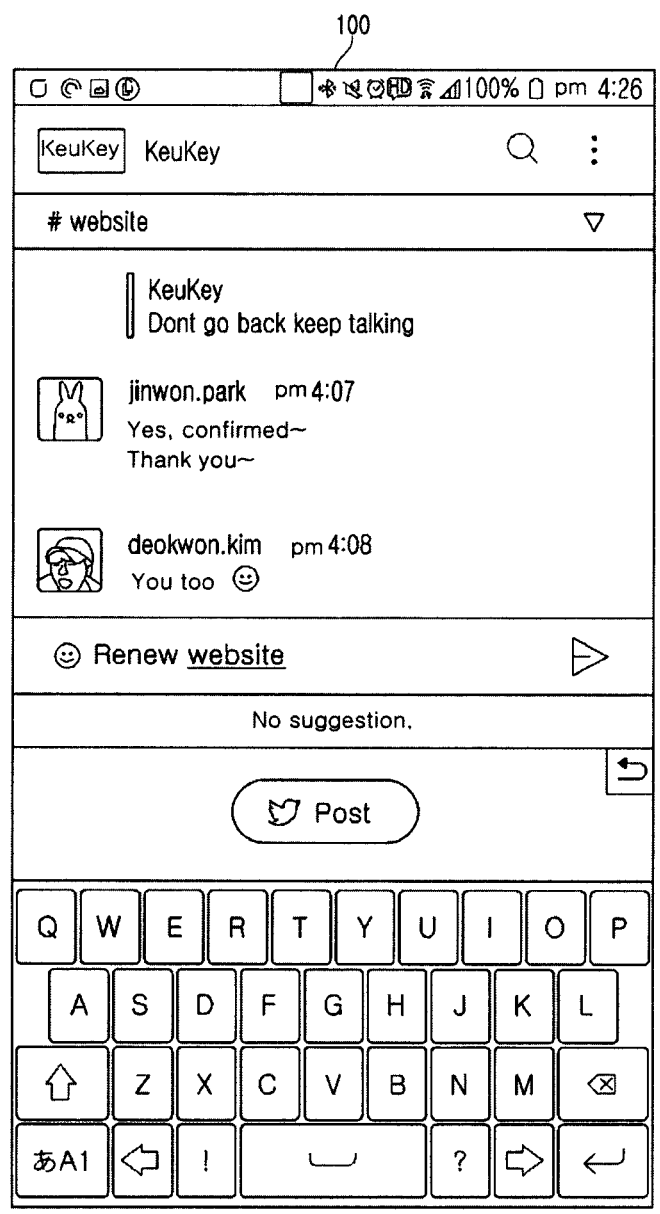

FIGS. 10 through 12 illustrate an example of performing a screen search and a TWITTER posting on a screen of the mobile device 100 according to one embodiment.

Referring to FIG. 10, in response to activating a virtual keyboard that is a text input device 130 on a screen of the mobile device 100, an icon designating a specific application may be displayed with the virtual keyboard. Icons displayed on the screen may include, for example, an icon 710 for a web search, an icon 720 for a search on a map (e.g., current location of the mobile device, etc.), an icon 730 for a contact search, icons 740, 770 for a search and playback of a video or music, an icon 750 for a posting on TWITTER, an icon 760 for searching for a specific place such as a restaurant, and the like.

FIG. 11 illustrates an example of executing a corresponding application using the icon 710 for the web search among icons displayed with the virtual keyboard (i.e., the text input device 130). Referring to FIG. 11, in response to touching the search icon 710 and inputting a keyword "keukey" through the virtual keyboard, a search result conducted by a predetermined search server using the keyword "keukey" is displayed on the screen. That is, in response to selecting the icon 710 and inputting the keyword "keukey", the processor 120 may display a search result of "keukey" on the display 110. The search result may be acquired from an external server through the communication device 140. The processor 120 may use a predetermined search application or a function of the corresponding application installed on the mobile device 100 to acquire the search result.

Here, since it is impossible to display all the search results on a limited screen space, a link button that functions to link to further inclusive information may be provided at a display portion that displays a primary search result. For example, if a user selects website address information that is a first arranged search result, the user may immediately connect to the corresponding website. In the example embodiment, a search may be conducted by the search server. For example, the search server may be a YAHOO server on the virtual keyboard itself. In this example, when a keyword is input to a search box of a GOOGLE site and a search result is conducted using the text box of the example embodiment, a search result conducted by the yahoo server is provided.

FIG. 12 illustrates an example of executing a corresponding application using the icon 750 for posting on TWITTER among icons displayed with the virtual keyboard. Referring to FIG. 12, in response to touching the TWITTER icon 750 and inputting a predetermined posting message through the virtual keyboard, the posting is performed through a TWITTER application and a search result thereof is displayed on a current screen. That is, the TWITTER application may be executed on the current screen without performing a screen switching. In other words, in response to selecting the icon 750, the processor 120 may execute the TWITTER application or a function of the TWITTER application, and may post the input message on a TWITTER account of the user of the mobile terminal 100 in response to a section of the user, i.e., in response to the user selecting a button "Post".

The example embodiment describes that the search result through the application execution result are displayed at locations at which icons designating the respective applications are displayed. However, it is provided as an example only. The search result may be displayed in another form unless the screen switching is required.

The example embodiment of executing an application or searching for the application on a screen of a mobile device 100 has been described above. Hereinafter, another example embodiment is described.

In recent times, technology for connecting a mobile device to a peripheral external device and directly controlling the peripheral external device that is connected to the mobile device is known. To this end, the mobile device needs to be connected to the peripheral external device. A variety of methods of connecting the mobile device to the peripheral external device include, for example, a method of automatically finding and connecting devices connected to the same wireless fidelity (WiFi) access point (AP), a method of automatically finding and connecting devices logged in the same account using the same server, a method of inputting a personal identification number (PIN) described on a device surface (e.g., a case or housing of a mobile device) on the server, specifying the device, and at the same time, approving a control right and connecting devices, a method of connecting a single device to another device through an inter-layer communication network, for example, a peer-to-peer (P2P) scheme, of WiFi, Bluetooth, and the like. A method of connecting the mobile device to a peripheral external device is not included in the scope of the disclosure and a further description related thereto is omitted.

Figure 13:
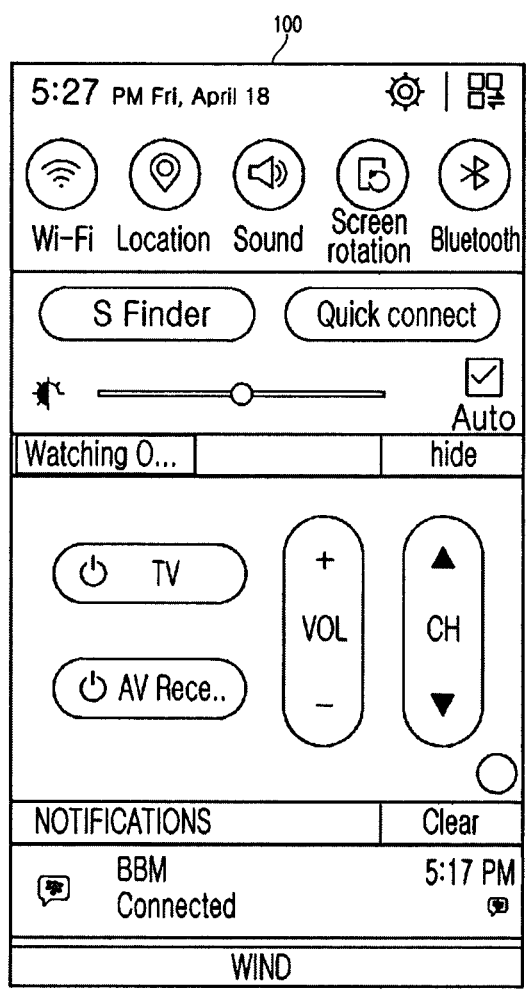
FIGS. 13 and 14 illustrate an example of controlling an external device through an application of a mobile device according to the related art.
Figure 14:
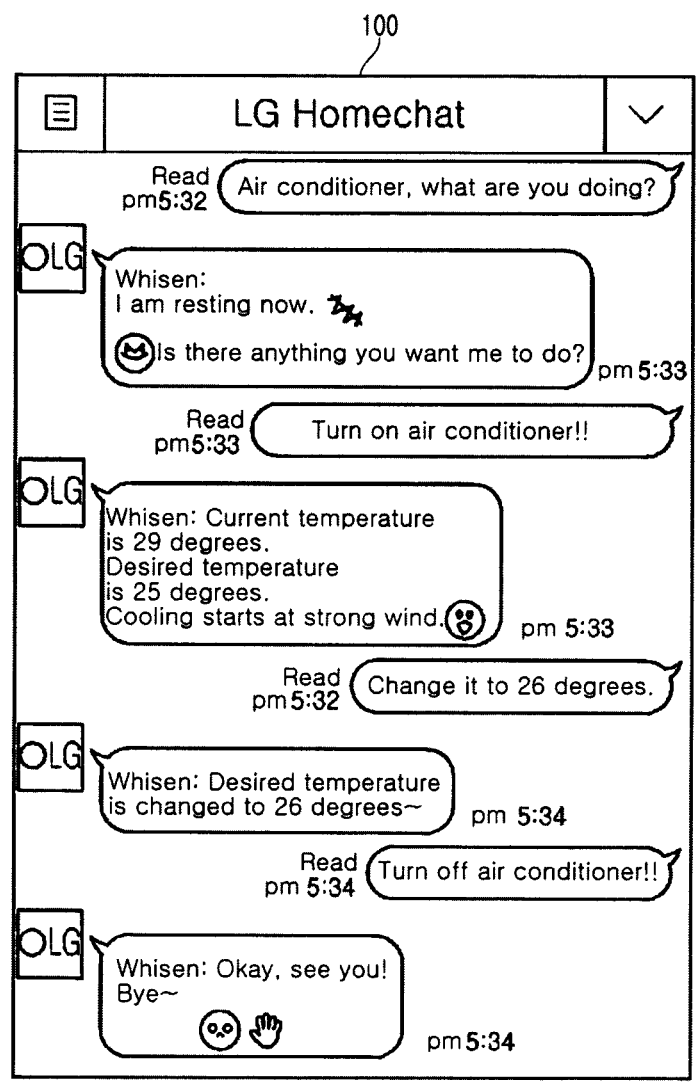

When the mobile device is connected to a peripheral external device, the external device may be controlled through a dedicated application installed on the mobile device. FIGS. 13 and 14 illustrate an example of controlling an external device through an application of a mobile device according to the related art. When executing a dedicated application, a scheme of controlling a device by displaying a remote controller on the screen of the mobile device and by touching a button of a desired function as shown in FIG. 14, and a scheme of controlling a device by displaying a conversation box and by transferring a desired task message in a conversation form, as shown in FIG. 15, may be used.

Accordingly, to control the external device, a cumbersome process of closing or terminating a screen of an application currently in use, executing the dedicated application, and inputting a control instruction need to be performed. In addition, an increase in a number of peripheral devices may cause cumbersomeness and inconvenience to increase in selecting an application. Also, an operating manual may be different for each device. In this case, it may be difficult to adapt to the manual.

Accordingly, to simplify a control of a peripheral external device through a mobile device 100, the inventor(s) of the present application provides a method of, in response to inputting a desired instruction, for example, a task message, and a text designating an external device to be controlled to a text box and giving a simple transmission instruction on any screen of a mobile device 100, transferring the instruction to an application for controlling the device, and executing the application. Hereinafter, various example embodiments of controlling a peripheral external device through a mobile device 100 are described.

Figure 15:
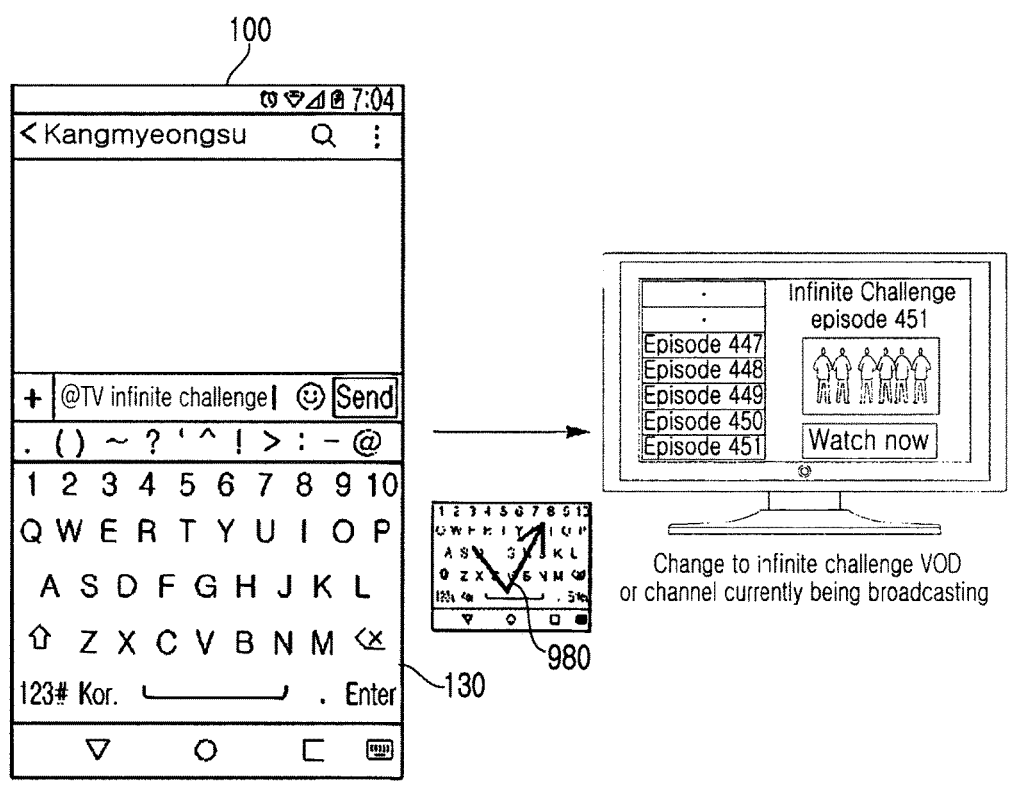
FIGS. 15 through 17 illustrate an example of controlling a television (TV) using a screen of a mobile device according to one embodiment.
Figure 16:
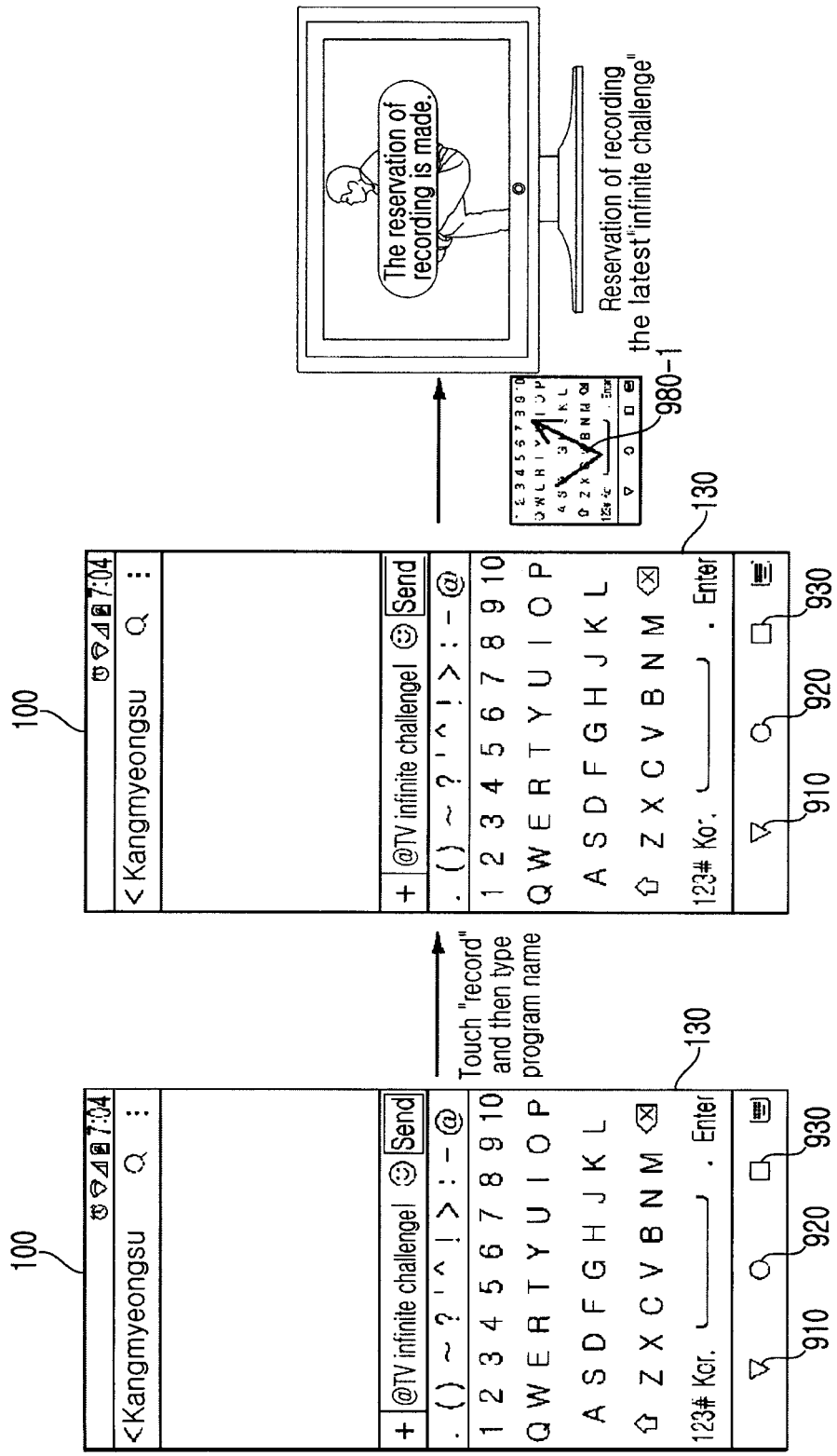

FIGS. 15 through 16 illustrate an example of controlling a television (TV) using a screen of the mobile device 100 according to one embodiment.

Referring to FIG. 15, when a TV or a set-top box is connected to the mobile device 100, a user inputs a text "@TV infinite challenge" to a text box of the current screen of the mobile device 100 and performs a swipe motion of "√" 980 on a touch screen. In response to detecting the motion of the user, the application recognizer 121 of the mobile device 100 recognizes a portion "TV" input with a symbol "@" from the input text as a portion associated with an application to be executed, the message recognizer 122 recognizes a portion "infinite challenge" as a task message to be performed on the application, and the transmission instruction detector 123 detects the swipe motion of "√" 980, for example, as a transmission instruction. Accordingly, the message transferor 124 transfers a task message for playing a video on demand (VOD) "infinite challenge" or a task message for changing to a channel in which "infinite challenge" is currently being broadcasted to a dedicated application for TV control. The corresponding application receives the task message, executes the task message, and controls the TV or the set-top box. Although the example embodiment describes that a program name is input as the task message to change a TV channel, the channel may be changed by directly inputting a desired channel number.

A TV controller controls various functions of a TV, such as a power ON/OFF function, a volume control function, a recording reservation function, etc., in addition to a channel change function. Accordingly, in response to recognizing that the user desires to control the TV through the dedicated application, a function designator of the processor 120 (not shown in FIG. 2) may display a plurality of functions on the screen so that the user may select a single desired function from among the plurality of functions.

Referring to FIG. 15, in response to an input of "@TV" in the text box of the current screen of the mobile device 100, the application recognizer 121 recognizes that the user desires to control the TV through the dedicated application for TV control. Here, a plurality of functions, such as the channel change function, the power ON/OFF function, the volume control function, the recording reservation function, etc., may be present as controllable functions. Thus, the function designator may display the plurality of functions at a lower end of the text box (e.g., as buttons 910, 920 and 930). Each of the plurality of functions may be executed in response to a selection on a corresponding button among buttons 910 to 930. If the user touches "record" or a button corresponding to "record" among the plurality of functions, additionally inputs a target program, and gives a message transmission instruction by inputting a swipe motion 980-1, the processor 120 may make a reservation of recording the latest episode of "infinite challenge" that is to be broadcasted for the user.

Figure 17:
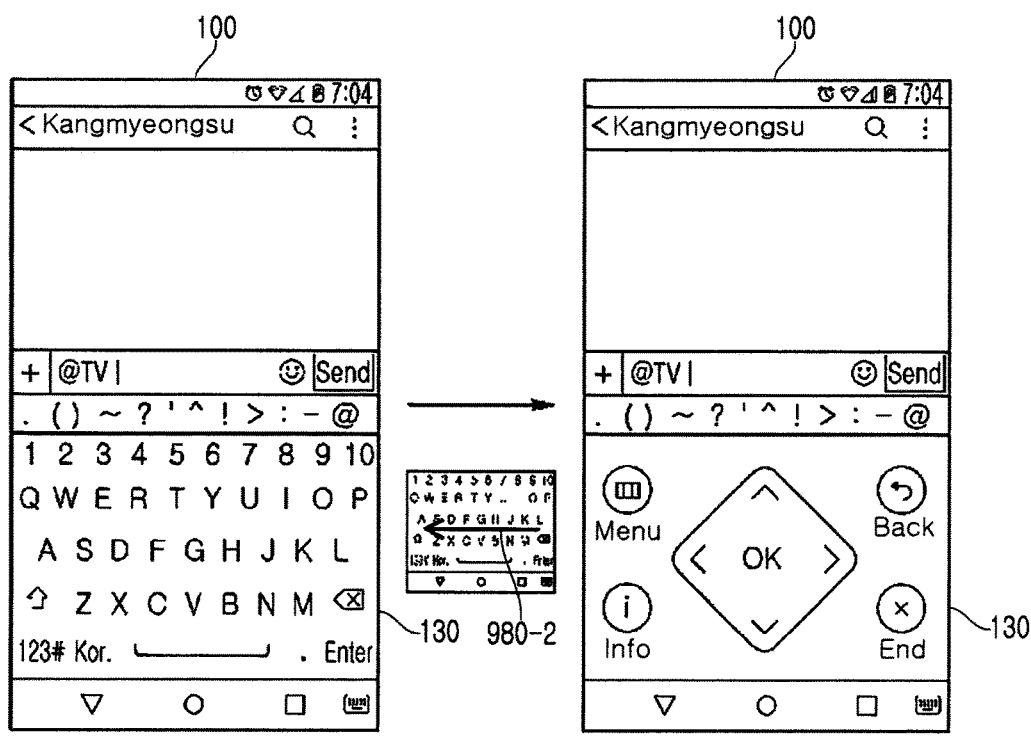

Referring to FIG. 17, in response to an input of "@TV" and a detection of a preset swipe motion, for example, a swipe motion 980-2 of a linear form from right to left, a remote controller for controlling the TV may be displayed on the current screen through the external device control screen display 114. The swipe motion 980-2 for displaying the remote controller may be set to be different from a swipe motion for transmitting a task message and a swipe motion for creating a text box. Any type of instructions that are distinguishably recognizable from execution instructions of other functions and recognized may be used.

A function of the remote controller for controlling the TV may be configured by a predetermined application, for example, an application that provides the function of the remote controller installed on the mobile terminal 100. That is, in response to detecting the input swipe motion 980-2 for displaying the remote controller, the processor 120 may display the remote controller for controlling the TV on a screen using the application.

Figure 18:
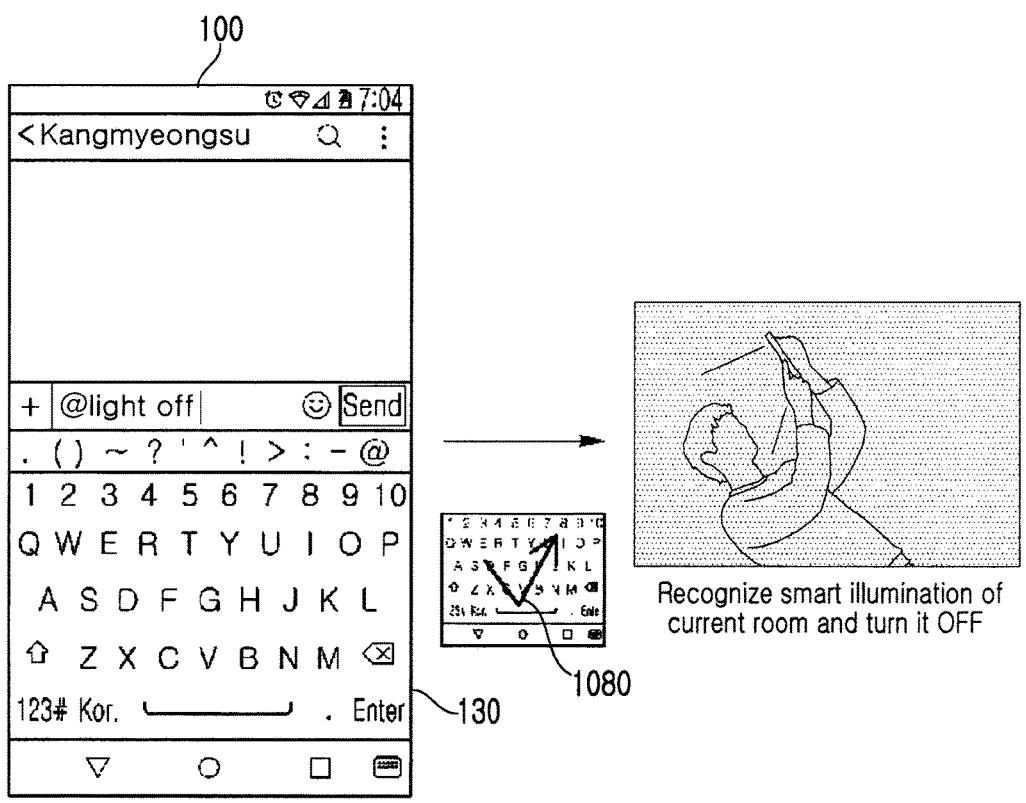
FIG. 18 illustrates an example of controlling an illumination of a screen of a mobile device according to one embodiment.

FIG. 18 illustrates an example of controlling an illumination in a room using the screen of the mobile device 100 according to one embodiment. Referring to FIG. 18, in response to inputting a text "@light off" to a text box and giving a task message transmission instruction by inputting a swipe motion 1080, a message of turning OFF a light, for example, a smart illumination, is transferred to an application of the mobile device 100 and the application is executed. Here, an indoor smart illumination uses a general indoor location recognition method of recognizing a BLE signal strength using the mobile device 100, and the like.

As described above, it is possible to turn OFF the illumination in a room using the screen of the mobile device 100 and to turn ON the illumination in the same manner without being deviated from a current location. Also, it is possible to control or inspect an illumination state, for example, an ON/OFF state, of another place, such as a living room, a kitchen, and the like.

A function of controlling or inspecting an illumination state of a room, for example, an ON/OFF state, may be configured by a predetermined application, for example, an application that provides the function of controlling or inspecting the illumination state installed on the mobile device 100. That is, in response to detecting the input swipe motion 1080, the processor 120 may control or inspect the illumination state in a room using the application. The processor 120 may communicate with the illumination to be controlled through the communication device 140, and thereby perform the function of inspection and control. Here, the illumination to be controlled or inspected may be regarded to interwork with the application.

Alternatively, instead of directly communicating with the illumination to be controlled, the mobile device 100 may control the illumination by communicating with a device, for example, a smart home management/control device, configured to manage the illumination.

Figure 19:
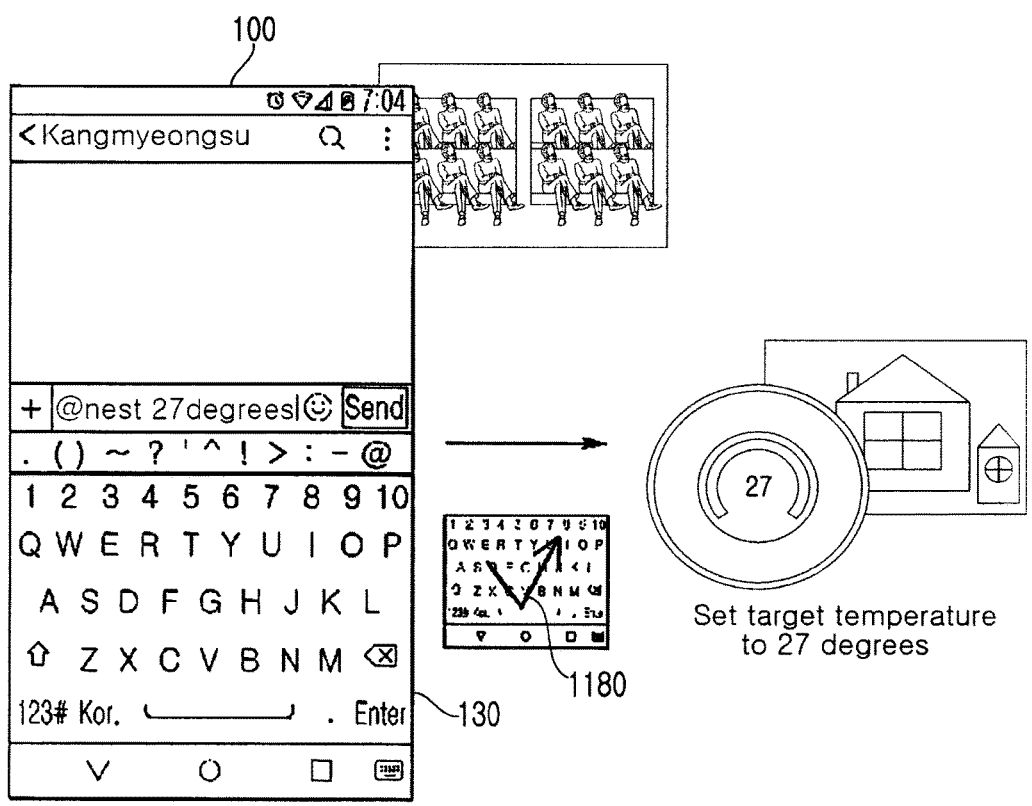
FIG. 19 illustrates an example of controlling a temperature controller using a screen of a mobile device according to one embodiment.

FIG. 19 illustrates an example of controlling a temperature controller for a NEST thermostat using a screen of the mobile device 100 according to one embodiment. Referring to FIG. 19, in response to inputting a text "@nest 27 degrees" and giving a task message transmission instruction by inputting a swipe motion 1180, a target temperature is transferred to a registered temperature controller through the mobile device 100 or a dedicated application of the mobile device 100 and a temperature adjustment is executed. Accordingly, although a user is out, a pleasant environment may be provided by cooling or heating in advance an indoor space at a desired temperature. The aforementioned temperature adjustment function may be configured by a predetermined application, for example, an application that provides a temperature adjustment function of a temperature controller. That is, in response to detecting the input swipe motion 1180, the processor 120 may perform a function of adjusting a temperature of the temperature controller using the application. The processor 120 may communicate with the temperature controller to be controlled through the communication device 140 and accordingly perform the temperature adjustment. Here, the temperature controller may be regarded to interwork with the application.

Alternatively, instead of directly communicating with the temperature controller to be controlled, the mobile device 100 may control the temperature controller by communicating with a device, for example, a smart home management/control device, configured to manage the temperature controller.

As described above, according to the example embodiment, it is possible to easily control an external device connected to a mobile device 100 by simply inputting a text on a screen of the mobile device 100 currently in use. In addition, according to the example embodiment, it is possible to retrieve an external device not connected to the mobile device 100 and to connect the retrieved external device to the mobile device 100.

Figure 20:
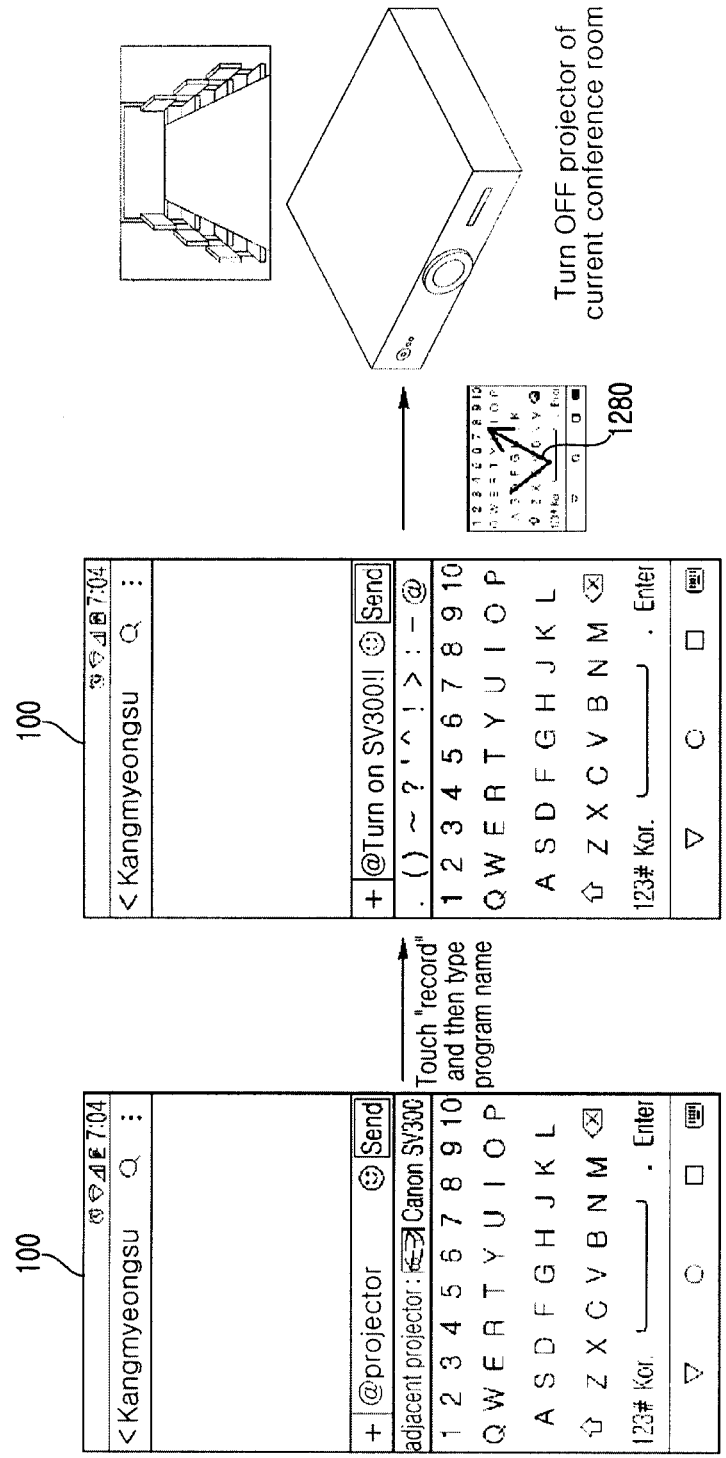
FIG. 20 illustrates an example of controlling a projector using a screen of a mobile device according to one embodiment.

FIG. 20 illustrates an example of controlling a projector using a screen of the mobile device 100 according to one embodiment. Referring to FIG. 20, once a user inputs a text "@projector", a projector located near the mobile device 100 is recognized and a control functions for the projector are displayed at a lower end of a text box on the screen. In response to the user selecting the recognized projector, a connection between the mobile device 100 and the projector is performed through the mobile device 100 or a dedicated application of the mobile device 100. This function may be executed through an external device searcher and connector. The user may control an operation of the connected projector by inputting a desired task message and by performing a swipe motion 1280, for example, a task message transmission instruction. According to the example embodiment, it is possible to unify an operation of searching for a peripheral external device of the mobile device 100 and an operation of connecting the external device to the mobile device 100. The aforementioned control function of the projector or the external device may be configured by a predetermined application, for example, an application that provides the control function of the projector or the external device, installed on the mobile device 100. That is, in response to detecting the input text "@projector", the processor 120 may identify a peripheral projector or an external device using the application. In response to detecting the input swipe motion 1280, the processor 120 may control the identified projector or the external device. The processor 120 may communicate with the projector or the external device to be controlled through the communication device 140 and accordingly, may control the projector or the external device. Here, the projector or the external device may be regarded to interwork with the application.

Alternatively, instead of directly communicating with the projector or the external device to be controlled, the mobile device 100 may control the projector or the external device by communicating with a device, for example, a smart phone management/control device, configured to manage the corresponding projector or external device.

According to example embodiments, a user may easily execute a desired application without switching a screen while using the mobile device 100. In particular, when there is a need to execute another application during the execution of an application on the mobile device 100, or control a peripheral external device of the mobile device 100, the user may simply execute the task of the other application by inputting a text on a current screen and by performing a preset swipe motion. Accordingly, it is possible to reduce the user inconvenience that may occur due to execution of the application and to reduce an amount of time to manipulate an existing application. In addition, it is possible to maintain the continuity of a task being performed by the user.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

Although the example embodiments are described with reference to the accompanying drawings, it will be understood by one of ordinary skill in the art that various other example embodiments may be implemented without departing from the technical scope or essential features of the disclosure. Therefore, the example embodiments are provided as examples only and the invention should not be construed as being limited to the example embodiments.

What is claimed is:

1. An application execution apparatus of a mobile device for executing an application while another application is currently being executed and displayed on a screen of the mobile device, the apparatus comprising:
    a text input device; and,
    at least one processor configured to:
        recognize an application to be executed based on text inputted into a text box by the text input device;
        recognize a task message to be performed on the recognized application to be executed based on text inputted through the text input device;
        detect a task message transmission instruction of a user;
        transfer the task message to the recognized application in response to detecting the task message transmission instruction; and
        execute, in the recognized application, the task message transferred,
    wherein the task message is executed on the recognized application without the screen of the mobile device switching from displaying of the currently executed application to the recognized application, and
    wherein the at least one processor recognizes the application to be executed on the text box in at least two different applications.

2. The apparatus of claim 1, wherein the at least one processor recognizes the text inputted with a specific symbol as the application to be executed, and recognizes a remaining portion as the task message to be performed on the application.

3. The apparatus of claim 2, wherein the at least one processor
    displays a plurality of applications on the screen to select a single application from among the plurality of applications, in response to the plurality of applications being designated to the text inputted with the specific symbol in the text inputted through the text input device.

4. The apparatus of claim 2, wherein the at least one processor transfers the input text to a memo application in response to an absence of the text inputted with the specific symbol in the text inputted through the text input device and in response to detecting the task message transmission instruction.

5. The apparatus of claim 1, wherein the at least one processor recognizes a preset first swipe motion of the user as the task message transmission instruction.

6. The apparatus of claim 1, wherein the at least one processor
    creates the text box in response to detecting a preset second swipe motion of the user on the screen on which the text box is absent.

7. The apparatus of claim 1, wherein the at least one processor displays an application execution result on the screen in response to executing the application.

8. The apparatus of claim 1, wherein the at least one processor
    displays a remote controller screen capable of controlling an external device in response to the application recognized being an application for controlling the external device and in response to detecting a preset third swipe motion of the user.

9. The apparatus of claim 1, wherein the at least one processor
    searches for an external device from among peripheral devices and connects the external device to the mobile device in response to the application recognized being an application for controlling the external device.

10. An application execution method of a mobile device for executing an application while another application is currently being executed and displayed on a screen of the mobile device, the method comprising:
    a text input operation;
    an application recognition operation of recognizing an application to be executed by a user based on text inputted into a text box by the text input operation;
    a message recognition operation of recognizing a task message to be performed on the recognized application to be executed based on the text inputted;
    a transmission instruction detection operation of detecting a task message transmission instruction of the user;
    a message transfer operation of transferring the task message to the application to be executed by the user in response to detecting the task message transmission instruction of the user; and
    an application execution operation of executing, in the recognized application, the transferred task message,
    wherein a task is executed on the recognized application without the screen of the mobile device switching from displaying of the currently executed application to the recognized application, and
    wherein the application recognition operation recognizes the application to be executed on the text box in at least two different applications.

11. The method of claim 10, wherein the application recognition operation recognizes the text inputted with a specific symbol as the application at which the task is to be performed, and the message recognition operation recognizes a remaining portion as the task message to be performed on the application.

12. The method of claim 11, further comprising:
    an application display operation of displaying a plurality of applications on the screen to select a single application from among the plurality of applications, in response to the plurality of applications being designated to the text inputted with the specific symbol in the text inputted in the text input operation.

13. The method of claim 11, wherein, in response to an absence of the text inputted with the specific symbol in the text inputted in the text input operation, when the task message transmission instruction is detected, the text inputted is transferred to a memo application.

14. The method of claim 10, wherein the transmission instruction detection operation recognizes a preset first swipe motion of the user as the task message transmission instruction.

15. The method of claim 10, further comprising:
a text box creation operation of creating the text box in response to detecting a preset second swipe motion of the user on the screen on which the text box is absent.

16. The method of claim 10, further comprising:
an instruction display operation of displaying a plurality of function on the screen in response to the plurality of functions being set to the application recognized in the application recognition operation.

17. The method of claim 10, further comprising:
an application execution notification operation of displaying an application execution result on the screen in response to executing the application in the application execution operation.

18. The method of claim 10, further comprising:
an external device control screen display operation of displaying a remote controller screen capable of controlling an external device in response to the application recognized in the application recognition operation being an application for controlling the external device and in response to detecting a preset third swipe motion of the user.

19. The method of claim 10, further comprising:
an external device searcher and connection operation of searching for an external device from among peripheral devices and connecting the external device to the mobile device in response to the application recognized in the application recognition operation being an application for controlling the external device.

20. A non-transitory computer readable recording medium storing program instructions for executing an application in a mobile device while another application is currently being executed and displayed on a screen of the mobile device, the instructions enabling the mobile device to perform the functions comprising:
a text input operation;
an application recognition operation of recognizing an application to be executed by a user based on text inputted into a text box by a text input device;
a message recognition operation of recognizing a task message to be performed on the recognized application to be executed based on the text inputted;
a transmission instruction detection operation of detecting a task message transmission instruction of the user;
a message transfer operation of transferring the task message to the application to be executed by the user in response to detecting the task message transmission instruction of the user; and
an application execution operation of executing, in the recognized application, the transferred task message,
wherein a task message is executed on the recognized application without the screen of the mobile device switching from displaying of the currently executed application to the recognized application, and
wherein the application recognition operation is configured to recognize the application to be executed on the text box in at least two different applications.

* * * * *